United States Patent
Bullivant

(10) Patent No.: US 7,445,057 B2
(45) Date of Patent: Nov. 4, 2008

(54) METHOD AND APPARATUS FOR INTRODUCING ELONGATE MEMBERS INTO THE GROUND

(75) Inventor: Roger A. Bullivant, Burton on Trent (GB)

(73) Assignee: Global Innovations, LLC, Lantana, TX (US)

( * ) Notice: Subject to any disclaimer, the term of this patent is extended or adjusted under 35 U.S.C. 154(b) by 44 days.

(21) Appl. No.: 11/330,490

(22) Filed: Jan. 12, 2006

(65) Prior Publication Data
US 2006/0213689 A1 Sep. 28, 2006

(30) Foreign Application Priority Data
Mar. 22, 2005 (GB) ................... 0505788.0

(51) Int. Cl.
*E21B 10/64* (2006.01)
*E21B 10/44* (2006.01)
*E02D 5/56* (2006.01)

(52) U.S. Cl. .................. 175/57; 175/262; 175/394; 175/257; 405/239; 165/45

(58) Field of Classification Search .......... 175/262, 175/323, 394, 57, 78, 257; 405/239, 253; 165/45
See application file for complete search history.

(56) References Cited

U.S. PATENT DOCUMENTS

| | | | | |
|---|---|---|---|---|
| 981,306 | A * | 1/1911 | Pollock ................ | 175/286 |
| 1,647,240 | A * | 11/1927 | McDonald ............ | 175/305 |
| 2,264,617 | A * | 12/1941 | Carpenter et al. ..... | 175/391 |
| 2,953,354 | A * | 9/1960 | Williams, Jr. .......... | 175/400 |
| 3,729,057 | A * | 4/1973 | Werner ................. | 175/262 |
| 3,941,197 | A * | 3/1976 | Stinson ................ | 175/400 |
| 4,168,755 | A * | 9/1979 | Willis .................. | 175/343 |
| 4,362,217 | A * | 12/1982 | Fletcher ............... | 175/402 |
| 4,531,596 | A * | 7/1985 | Kleine ................. | 175/384 |
| 4,579,668 | A * | 4/1986 | Messenger ............ | 507/118 |
| 4,691,789 | A * | 9/1987 | Richards et al. ....... | 175/62 |
| 4,741,389 | A * | 5/1988 | Smith .................. | 165/45 |

(Continued)

FOREIGN PATENT DOCUMENTS

JP 06323078 A * 11/1994

OTHER PUBLICATIONS

"Eurodrill Drilling and Casing Systems", Eurodrill, Derbyshire, England, 16 pages, undated.

*Primary Examiner*—Shane Bomar
(74) *Attorney, Agent, or Firm*—Thompson & Gustavson, L.L.P.

(57) ABSTRACT

A drill head has a domed leading face and carries cutting teeth. A tubular drill string can be used to drive the head into the ground. An off-center aperture communicates with the bore of the string, by means of a connecting passage, which defines an oblique cone. During drilling, a flushing medium can be pumped down the bore and out through the aperture. As the drill string and head are withdrawn, an elongate member can be introduced down the bore, out through the aperture, to be left in the passage drilled by the head. The form of the mouths and connecting passage avoid the elongate member encountering any discontinuities which would prevent it leaving the head. The elongate member could be reinforcing bar for a cast-in-situ pile, or part of a ground loop for a ground heat energy system.

28 Claims, 3 Drawing Sheets

U.S. PATENT DOCUMENTS 5,052,502 A * 10/1991 Jurgens et al. ................ 175/80
5,147,852 A * 9/1992 Cowan et al. ............... 507/104
6,368,021 B1 * 4/2002 Strong et al. ................ 405/228
6,478,512 B2 * 11/2002 Sherwood ................... 405/232
6,592,300 B2 * 7/2003 Yang et al. .................. 405/241
6,978,849 B2 * 12/2005 Sherwood .................... 175/57

* cited by examiner

METHOD AND APPARATUS FOR INTRODUCING ELONGATE MEMBERS INTO THE GROUND

BACKGROUND OF THE INVENTION

The present invention relates to improvements in or relating to methods and apparatus for introducing elongate members into the ground.

A known type of energy system which makes use of ground heat uses ground loops which extend down into the ground from a building to be heated or cooled. Each ground loop consists of a relatively narrow pipe through which a heat conducting fluid can pass down into the ground in liquid form, and a relatively wide pipe through which the fluid may return to the surface, having gained or discharged heat from or to the ground. This energy is extracted at the surface by a heat exchanger. The two pipes of the ground loop typically extend alongside each other into the ground and form an elongate member which is only a few centimeters in width. In many circumstances, introduction of the ground loop into the ground cannot be achieved by means of a simple drill arrangement to form a bore, because the small size of the required bore, and the depth required, create a significant risk of the bore collapsing as the drill retreats. Accordingly, it is common to use two drilling operations. In a first, a wide pipe with cutting teeth around its lowermost mouth is drilled into the ground by rotation, until bedrock is reached, thus providing a lining through which a second drill can reach down to bore into the bedrock, with the bore being prevented from collapse by the lining. This has the disadvantage of requiring two drilling operations.

In an alternative, a pipe is used to drive a drill head which is lost as the pipe is removed, or has a mechanical gate which opens as the pipe and head are removed, in either event allowing the ground loop to be left in the bore. Lost cutting heads represent an unacceptable cost. Mechanical release mechanisms and mechanical gates and other arrangements are prone to failure, which may result in the bore being unusable, and a further bore being required.

SUMMARY OF THE INVENTION

The present invention provides a method of introducing an elongate member into the ground, in which a drill head is drilled into the ground to provide a passage from the surface, the drill head being driven by a tubular drive arrangement and having an aperture through which the bore of the drive arrangement is in communication with the passage, and in which the elongate member is introduced to the passage through the bore and the aperture, the elongate member passing substantially unobstructed through the aperture into the passage as the drive arrangement and drill head are withdrawn from the passage.

The drill head is preferably a rotary drill head. The drive arrangement is preferably a rotary drill string.

The aperture is preferably off-center relative to the axis of rotation of the head during drilling. The aperture preferably communicates with the bore by means of a connecting passage between a mouth opening into the bore, and a mouth forming the aperture. The connecting passage is preferably inclined relative to the rotation axis of the head, during drilling. The connecting passage mouth which opens into the bore preferably has an outline, transverse to the bore, which substantially wholly surrounds the transverse outline of the bore. The connecting passage walls are preferably substantially without discontinuities from the bore mouth to the passage mouth. The connecting passage walls preferably define an oblique cone whose base is at the bore mouth. The passage mouth of the connecting passage may be provided with means operable, in use, to resist plugging of the passage mouth by drilling spoil. For example, the passage mouth may be provided with a closure or a reducer.

The drill string and/or the drill head is preferably provided with at least one external screw flight for drawing spoil from the passage during drilling.

The drill head may have at least one gulley around its periphery for the passage of spoil and/or flushing medium.

The invention also provides a method of introducing a ground loop for a ground heat system in accordance with the method set out above, wherein the elongate member is a ground loop.

The invention also provides a method of forming a pile, in which at least one reinforcing member is introduced into the ground by the method set out above, and the passage is filled with settable material after introducing the reinforcing member.

The settable material may be cementitious, such as concrete.

The invention also provides a drill head operable to drill a passage into the ground, and having an aperture through which an elongate member may pass through the head as the head is removed from the passage, thereby leaving the elongate member in the passage after the head is removed, the aperture having a mouth for receiving the elongate member, which is sufficiently large to substantially prevent any discontinuity around the mouth from engaging the end of the elongate member to block the member from entering the mouth.

The aperture is preferably off-center relative to the axis of rotation of the head during drilling. The aperture preferably communicates by means of a connecting passage with a second mouth for receiving an elongate member to pass through the head. The connecting passage is preferably inclined relative to the rotation axis of the head, during use. The connecting passage walls are preferably substantially without discontinuity from the second mouth to the aperture. The connecting passage walls may define an oblique cone whose base is at the second mouth. The connecting passage may be provided, in the region of the aperture, with means operable, in use, to resist plugging of the aperture by drilling spoil, such as a closure or a reducer.

The drill head may be provided with at least one external screw flight for drawing spoil from the passage during drilling. The drill head may have at least one gulley around its periphery for the passage of spoil and/or flushing medium.

The invention also provides a drill arrangement comprising a drill head as defined above, a drill string operable to drive the drill head, the drill string being tubular and having a bore with which the drill head aperture communicates for receiving an elongate member introduced along the bore and through the aperture to the passage.

The head preferably has a connection passage mouth which opens into the bore and has an outline, transverse to the bore, which substantially wholly surrounds the transverse outline of the bore.

The drill string is preferably provided with at least one external screw flight for drawing spoil from the passage during drilling.

BRIEF DESCRIPTION OF THE DRAWINGS

Examples of the present invention will now be described in more detail, by way of example only, and with reference to the accompanying drawings, in which:

FIGS. 1 to 4 illustrate a method of introducing an elongate member, such as a ground loop, into the ground.

DETAILED DESCRIPTION

Figure 1:
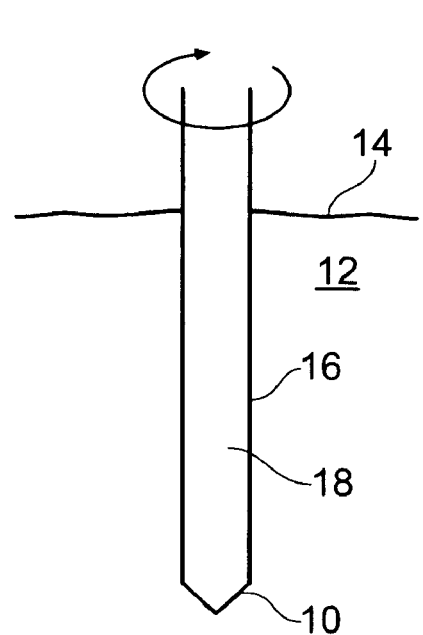
FIGS. 1 to 4 illustrate, highly schematically, one example of a method according to the present invention.

In the first stage (FIG. 1), a drill head 10 is drilled into the ground 12 to provide a passage from the surface 14. The drill head 10 is driven by a drive arrangement 16. In this example the drill head 10 is a rotary drill head, and the drive arrangement 16 is a drill string, which may be a series of connected tubular members, according to the depth required.

The drill head 10 has a substantially unobstructed aperture (to be described below) through which the bore 18 of the drill string 16 is in communication with the passage being formed.

Figure 2:
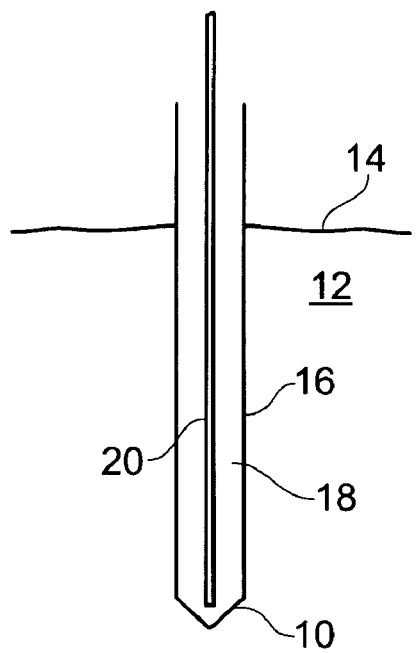
Figure 3:
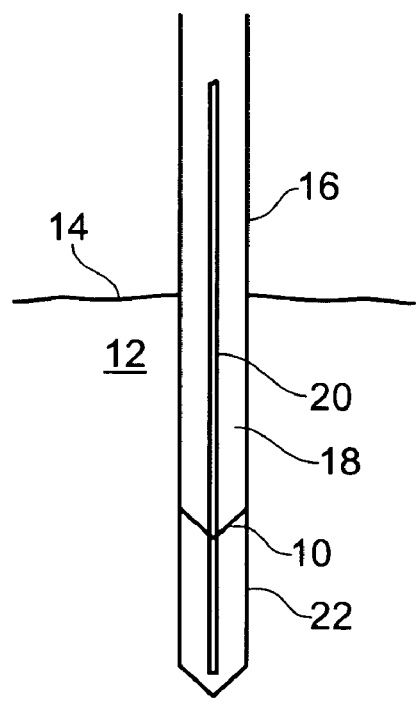

Once the drill head 10 has been drilled down to the required depth (FIG. 2), the elongate member 20 is introduced down the bore 18, to the drill head 10 and the aperture in the drill head. The drill string 16 is then withdrawn from the passage 22 (FIG. 3), withdrawing the drill head 10 with it. As the drill head 10 is withdrawn, the elongate member 20 passes through the aperture in the drill head 10, remaining in the passage 22 after the drill string 16 has been fully removed (FIG. 4).

Figure 4:
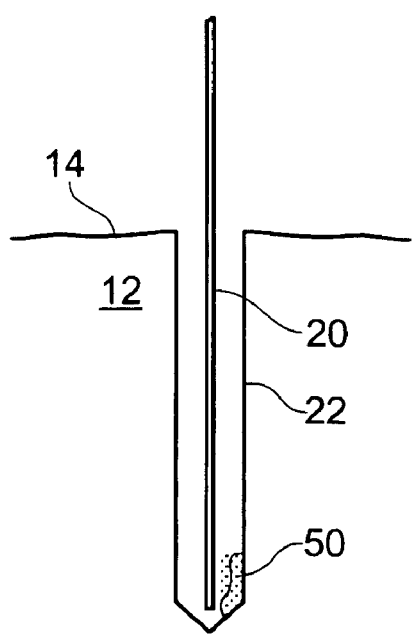

If the elongate member 20 is a ground loop for a ground heat energy system, the elongate member 20 may simply be left in the passage 22, as shown in FIG. 4, in view of the tendency of the passage walls to collapse with time, thereby filling in the space around the elongate member 20.

Alternatively, the elongate member 20 may be a reinforcing bar ("rebar") for a pile, in which case the passage 22 will be much larger than the rebar 20, achieved by using a large drill head 10. The passage 22 can be filled with settable material 50 such as a cementitious material, preferably concrete, after the drill string 16 and drill head 10 have been removed, leaving a cast in-situ, reinforced concrete pile in the passage 22. It will be appreciated that a particular advantage of the invention is to allow the operator confidence that the rebar 20 extends the whole depth of the passage 22.

Other features of the invention can best be described by reference to the remaining figures, which show various examples of drill head 10, in more detail.

Figure 5:
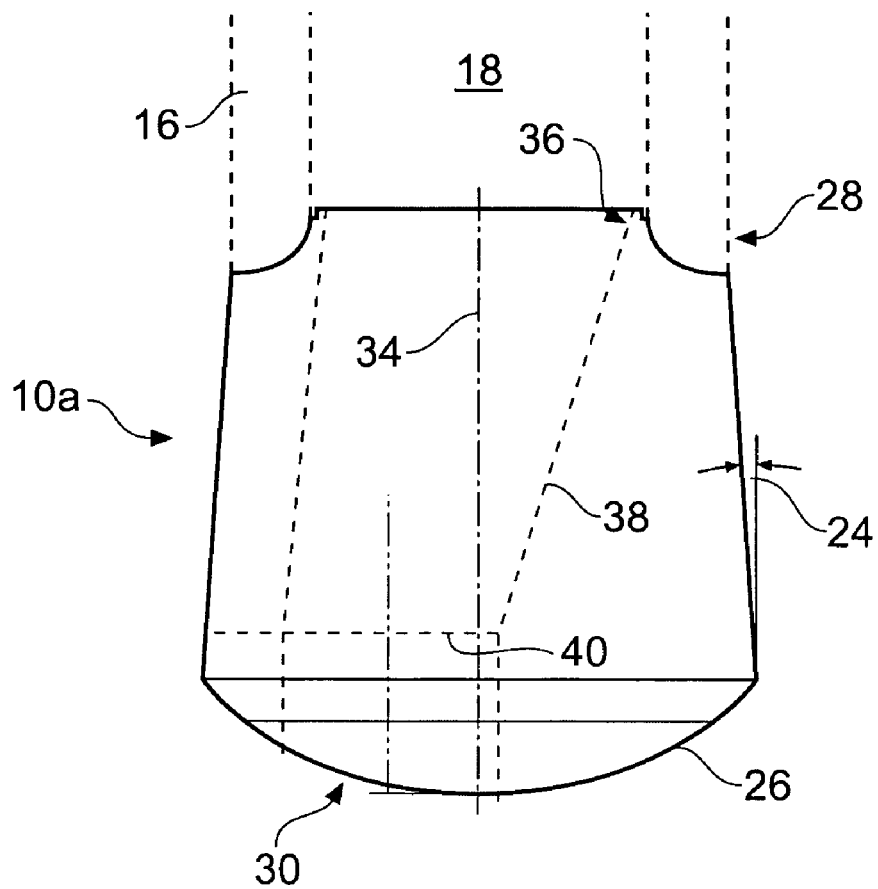
FIGS. 5 and 6 are, respectively, a side view and an end view of a first drill head in accordance with the present invention.
Figure 6:
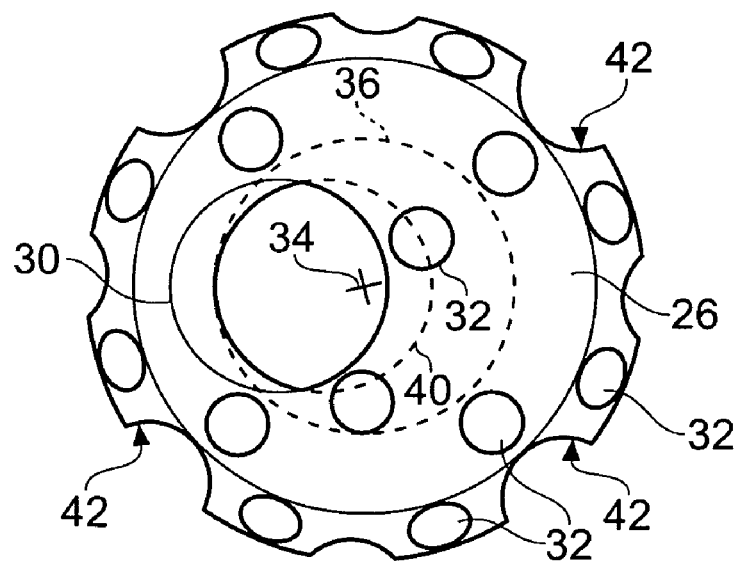

FIGS. 5 and 6 show a drill head 10A which is domed, but could alternatively be flat. FIG. 5 illustrates the drill head 10A without cutting teeth which are shown on FIG. 6.

The main body of the head 10A has side walls 24 which taper slightly from a domed leading face 26 back to a neck at 28, at which the head 10A has shoulders to be received in the lower mouth of the drill string 16. The slight taper of the side walls 24 causes the diameter of the domed leading face 26 to be slightly greater than the external diameter of the drill string 16, resulting in an overbreak drilling action which leaves a slight clearance around the drill string 16, within the passage 22. This provides a return path for a flushing medium such as air, water or foam, pumped down the bore 18 to the head 10A, and returning up the passage 22, outside the drill string 16, flushing spoil to the surface. The flushing medium leaves the bore 18 through the head 10A, by means of an aperture 30, as will be described.

The domed leading face 26 carries teeth 32 of appropriately shaped and hard material, such as tungsten carbide, sintered diamond or other wear resistant material. These may be called "ballistic tips" in view of their shape, which resembles small bullets. The teeth 32 are arrayed across the domed leading face 26, around the aperture 30.

It can readily be seen from FIG. 6 that the aperture 30 is off-center relative to the rotation axis 34 of the drill head 10A, during drilling.

The aperture 30 communicates within the drill head 10A with a mouth 36 open to the bore 18, by means of a connecting passage 38. Thus, there is communication from the bore 18 through the mouth 36, connecting passage 38 and aperture 30 to the passage 22 around the head 10A.

The connecting passage 38 is inclined relative to the rotation axis 34 and may, for example, define an oblique cone whose base is at the mouth 36 and which is truncated at 40 to meet the aperture 30.

It is important to note from FIG. 5, that the diameter of the mouth 36 is substantially the same as the internal diameter of the bore 18. Thus, the outline of the mouth 36, transverse to the bore 18, substantially wholly surrounds the transverse outline of the bore 18, being substantially coincident in this example. In other examples, the mouth 36 may be wider than the bore 18. The shape of the outlines may differ. For example, the bore may be square in outline, circumscribed by a circular mouth 36, or the bore may be circular, wholly contained within the outline of a square mouth 36. Many other examples can be envisaged. The significance of containing the bore outline within the mouth outline will become apparent below.

It can readily be seen that the smooth surface of the oblique cone defining the connecting passage 38 results in an absence of discontinuities along the connecting passage 38, between the mouth 36 and the level 40 at which the connecting passage 38 meets the aperture 30.

The mouth 36, connecting passage 38 and aperture 30 are unobstructed during use, so that as the drill head 10A is turned around the rotation axis 34, causing the teeth 32 to cut into the ground below, flushing medium can be pumped down the bore 18, through the drill head 10A by means of the connecting passage 38, into the passage 22 below the drill head 10A, and returning to the surface around the drill string 16, flushing spoil with it. Additional teeth may be provided around the side wall 24, to assist in breaking up spoil as it is removed.

The off-center position of the aperture 30 ensures that although the aperture 30 does not itself contribute to cutting, the area left uncut by the aperture 30 is swept by the teeth 32 as the drill head 10A turns, so that substantially the whole of the ground surface against the domed leading face 26 is cut away as the drill head 10A advances. This would not be the case in the event that the aperture 30 was centered on the rotation axis 34, in which case the area of the aperture 30 would be left uncut.

When the head 10A has been drilled down to the required depth, the elongate member 20 can be introduced down the bore 18. The relative size of the mouth 36 and the bore 18, as described above, ensures that the lower extremity of the elongate member 20 will reliably enter the mouth 36 from the bore 18, and then be guided by the walls of the connecting passage 38 down to the aperture 30. Throughout this operation, the elongate member 20 will not encounter any steps or similar discontinuities which could result in the elongate member 20 being engaged and prevented from further downward travel.

As the elongate member 20 leaves the aperture 30, the drill string 16 and drill head 10A can be withdrawn and as this happens, the elongate member 20 will pass through the drill head 10A, being left in the passage 22, as described above.

Movement of flushing medium may be further facilitated by forming gulleys 42 around the drill head 10A. The gulleys 42 allow flushing medium and spoil to pass up around the drill head 10A, away from the domed leading face 26. The outline of the drill head 10A, between the gulleys 42, serves to keep the head centered at the vertical axis of the passage 22. The width and shape of the gulleys 42 may vary from that shown. For example, the gulleys 42 may be wider than their separation from each other. The gulleys 42 may be formed as flats machined or otherwise formed on the drill head 10A.

Figure 7:
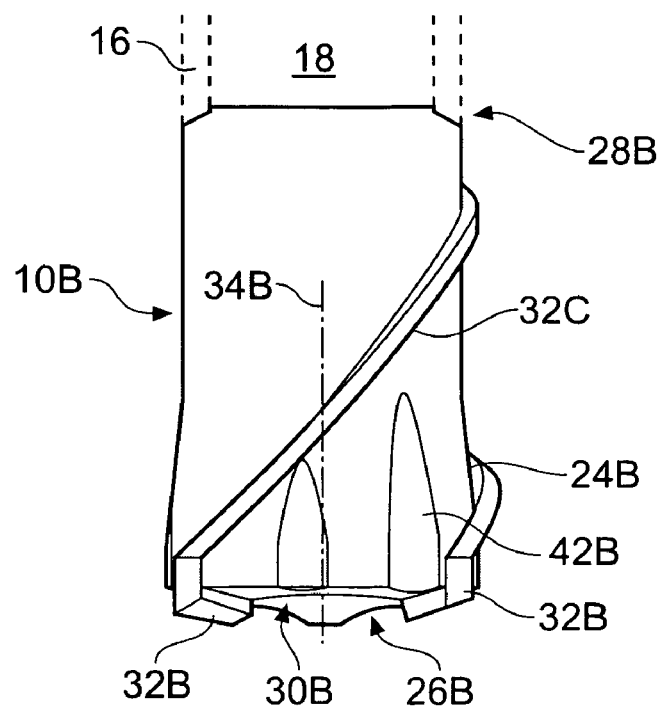
FIGS. 7 and 8 correspond with FIGS. 5 and 6, on a reduced scale, showing an alternative embodiment of a drill head.
Figure 8:
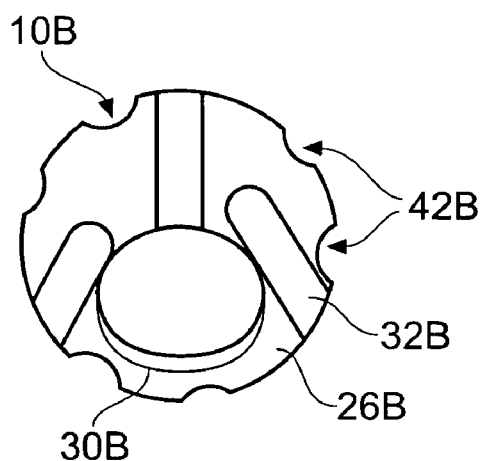

FIGS. 7 and 8 show an alternative example of a drill head 10B in which many features correspond with features of the example of FIGS. 5 and 6, and are given like numerals, suffixed B.

In FIGS. 7 and 8, the main body of the drill head 10B has slightly tapering side walls 24B in which flushing gulleys 42B are formed. The domed leading face 26B is flatter than in the example of FIGS. 5 and 6, and carries elongate cutting teeth 32B. A neck 28B is formed to receive a drill string 16, as described above. An aperture 30B is provided in the domed leading face 26B. The aperture 30B is in communication through a connecting passage 38B through the body of the drill head 10B, with a further mouth 36B, open to the bore 18. The mouth 36B is sufficiently large to have an outline, transverse to the bore 18, which substantially wholly surrounds the transverse outline of the bore so that, as described above, a smooth transition is achieved from the internal diameter of the bore 18 to the connecting passage 38B.

The aperture 30B is off-set relative to the rotation axis 34B.

Additional cutting teeth 32C may be provided around the side wall 24B. These form a helical flight which assists in transporting spoil up the passage being formed, and may obviate the need for a flushing medium.

The drill head 10B may be used in a manner similar to that described above in relation to FIGS. 5 and 6. The drill head 10B is driven into the ground to the required depth, with flushing medium (if required) being pumped down the bore 18, to leave the drill head 10B through the connecting passage 38B and aperture 30B, returning through the gulleys 42B and around the drill string 16 to flush spoil from the passage being formed. Once the required depth has been reached, an elongate member is introduced down the bore 18 and smoothly into the connecting passage 38B, by virtue of the absence of ledges, steps or the like to snag the lower extremity of the elongate member 20. The drill string 16 can then be withdrawn, withdrawing the drill head 10B with it, and allowing the elongate member 20 to pass through the drill head 10B by means of the connecting passage 38, to be left in the passage 22 after the drill head 10B has been fully withdrawn.

The off-center position of the aperture 30B ensures that although the aperture 30B does not itself contribute to cutting, the area left uncut by the aperture 30B is swept by the teeth 32B as the drill head 10B turns, so that substantially the whole of the ground surface against the domed leading face 26B is cut away as the drill head 10B advances. This would not be the case in the event that the aperture 30B was centered on the rotation axis 34B, in which case the area of the aperture 30B would be left uncut.

Figure 9:
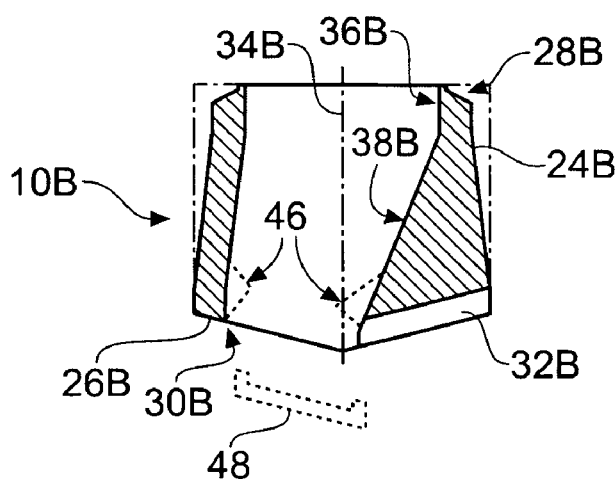
FIG. 9 is a section through the drill head of FIGS. 7 and 8, illustrating the internal passage.

FIG. 9 is a cross-section drawn primarily to show more detail of the form of the connecting passage 38B of the drill head of FIGS. 7 and 8. Similar arrangements are provided in the head of FIGS. 5 and 6. Reference to the rotation axis 34B clearly shows the oblique conical nature of the connecting passage 38B, and the off-center position of the aperture 30B, leaving virtually no area which is not swept by cutting blades, cutting teeth etc.

In the above examples, the use of a flushing medium has been described. It is envisaged that an alternative arrangement can be used, which dispenses with the need for a flushing medium. Thus, the drill string 16 may be provided with flights around its outer surface, from the drill head 10 to the surface 14. This allows spoil to be pulled up the passage 22, in the manner of an Archimedean screw, to remove spoil from the passage 22 without requiring flushing medium.

However, in addition to removing spoil, the flow of flushing medium has the effect of keeping the aperture 30 open. This is important to allow the introduction of the elongate member 20, subsequently. In the absence of flushing medium, an alternative measure may be necessary to prevent blockage of the aperture 30. Two possibilities are envisaged. Both are indicated in FIG. 9, by broken lines. One alternative uses a slight restriction 46 in the connecting passage 38, just above the aperture 30. This constriction results in a tendency to prevent spoil penetrating the connecting passage 38 sufficiently to reach its natural angle of repose, so that the connecting passage 38 will not become plugged by compacted spoil. This effect is similar to that of a reducer feature customarily incorporated in open ended pipes when being driven by vibration.

Alternatively, the aperture 30 could be provided with a disposable cover 48 which prevents ingress of spoil during cutting, but can be pushed from the drill head 10 by the elongate member 20, to open the aperture 30. The cover thereafter remains lost at the bottom of the passage 22.

It can be seen from the above description that in each example, installation of the elongate member 20 takes place with a single drilling action, which is beneficial in speed and cost. The techniques and apparatus described can be applied to the formation of relatively narrow passages for receiving narrow members such as ground loops, or the formation of wider passages for cast in-situ piles with elongate reinforcing bars, or in other ways. The skilled reader will envisage a wide range of possible materials and forms of teeth, blades and other cutting arrangements at the head.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of introducing an elongate member into the ground, in which a drill head is drilled into the ground to provide a passage from the surface, the drill head being driven by a tubular drive arrangement including rotation of the drill head about an axis of rotation and having an aperture through which the bore of the tubular drive arrangement is in communication with the passage, and in which the elongate member has a length commensurate with the passage depth and is introduced to the passage through the bore and the aperture, the elongate member passing substantially unobstructed through the aperture into the passage as the tubular drive arrangement and drill head are withdrawn from the passage, wherein the aperture is off-center relative to the axis of rotation of the head during drilling.

2. A method according to claim 1 wherein the drill head is a rotary drill head.

3. A method according to claim 1, wherein the tubular drive arrangement is a rotary drill string.

4. A method according to claim 1, wherein the aperture communicates with the bore by means of a connecting passage between a mouth opening into the bore, and a mouth forming the aperture.

5. A method according to claim 4, wherein the connecting passage is inclined relative to the axis of rotation of the head, during drilling.

6. A method of introducing an elongate member into the ground, in which a drill head is drilled into the ground to provide a passage from the surface, the drill head being driven by a tubular drive arrangement and having an aperture through which the bore of the tubular drive arrangement is in communication with the passage, and in which the elongate member has a length commensurate with the passage depth and is introduced to the passage through the bore and the aperture, the elongate member passing substantially unobstructed through the aperture into the passage as the tubular drive arrangement and drill head are withdrawn from the passage, wherein the aperture communicates with the bore by means of a connecting passage between a mouth opening into the bore, and a mouth forming the aperture and wherein the connecting passage mouth which opens into the bore has an outline, transverse to the bore, which substantially wholly surrounds the transverse outline of the bore.

7. A method according to claim 4, wherein the connecting passage has walls, the connecting passage walls are substantially without discontinuities from the bore mouth to the passage mouth.

8. A method of introducing an elongate member into the ground, in which a drill head is drilled into the ground to provide a passage from the surface, the drill head being driven by a tubular drive arrangement and having an aperture through which the bore of the tubular drive arrangement is in communication with the passage, and in which the elongate member has a length commensurate with the passage depth and is introduced to the passage through the bore and the aperture, the elongate member passing substantially unobstructed through the aperture into the passage as the tubular drive arrangement and drill head are withdrawn from the passage, wherein the aperture communicates with the bore by means of a connecting passage between a mouth opening into the bore, and a mouth forming the aperture and wherein the connecting passage has walls, and the connecting passage walls define a oblique cone whose base is at the bore mouth.

9. A method according to claim 4, wherein the passage mouth of the connecting passage is provided with means operable, in use, to resist plugging of the passage mouth by drilling spoil.

10. A method according to claim 9, wherein the passage mouth is provided with a closure or a reducer.

11. A method according to claim 1, wherein the drill string and/or the drill head is provided with at least one external screw flight for drawing spoil from the passage during drilling.

12. A method according to claim 1, wherein the drill head has at least one gulley around its periphery, for the passage of spoil and/or flushing medium.

13. A method in accordance with the method of claim 1, wherein the elongate member is a ground loop.

14. A method in accordance with the method of claim 1, wherein the passage is filled with settable material after introducing the elongate member.

15. A method according to claim 14, wherein the settable material is cementitious.

16. A method according to claim 15, wherein the settable material is concrete.

17. A drill head operable to drill a passage into the ground, and having an aperture through which an elongate member may pass through the drill head as the drill head is removed from the passage, the elongate member having a length commensurate with the passage depth, thereby leaving the elongate member in the passage after the drill head is removed, the aperture having a mouth for receiving the elongate member, which is sufficiently large to substantially prevent any discontinuity around the mouth from engaging the end of the elongate member to block the elongate member from entering the mouth, the drill head having an axis of rotation during drilling and wherein the aperture is off-center relative to the axis of rotation of the drill head during drilling.

18. A drill head according to claim 17, wherein the aperture communicates by means of a connecting passage with a second mouth for receiving the elongate member to pass through the drill head.

19. A drill head according to claim 18, wherein the connecting passage is inclined relative to the axis of rotation of the drill head, during use.

20. A drill head according to claim 18, wherein the connecting passage has walls, and the connecting passage walls are substantially without discontinuity from the second mouth to the aperture.

21. A drill head operable to drill a passage into the ground, and having an aperture through which an elongate member may pass through the drill head as the drill head is removed from the passage, the elongate member having a length commensurate with the passage depth, thereby leaving the elongate member in the passage after the drill head is removed, the aperture having a mouth for receiving the elongate member, which is sufficiently large to substantially prevent any discontinuity around the mouth from engaging the end of the elongate member to block the elongate member from entering the mouth, wherein the aperture communicates by means of a connecting passage with a second mouth for receiving an elongate member to pass through the drill head and the connecting passage has walls, wherein the connecting passage walls define an oblique cone whose base is at the second mouth.

22. A drill head according to claim 18, wherein the connecting passage is provided, in the region of the aperture, with means operable, in use, to resist plugging of the aperture by drilling spoil.

23. A drill head according to claim 17, having at least one external screw flight for drawing spoil from the passage during drilling.

24. A drill head according to claim 17, having at least one gulley around its periphery for the passage of spoil and/or flushing medium.

25. A drill head as defined in claim 17, a drill string operable to drive the drill head, the drill string being tubular and having a bore with which the drill head aperture communicates for receiving the elongate member introduced along the bore and through the aperture to the passage.

26. A drill head operable to drill a passage into the ground, and having an aperture through which an elongate member may pass through the drill head as the drill head is removed from the passage, the elongate member having a length commensurate with the passage depth, thereby leaving the elongate member in the passage after the drill head is removed, the aperture having a mouth for receiving the elongate member, which is sufficiently large to substantially prevent any discontinuity around the mouth from engaging the end of the elongate member to block the elongate member from entering the mouth, a drill string operable to drive the drill head, the drill string being tubular and having a bore with which the drill head aperture communicates for receiving an elongate member introduced along the bore and through the aperture to the passage, wherein the mouth opens into the bore and has an outline, transverse to the bore, which substantially wholly surrounds the transverse outline of the bore.

27. A drill head according to claim 25, wherein the drill string is provided with at least one external screw flight for drawing spoil from the passage during drilling.

28. A drill head according to claim 22, wherein the operable means is a closure or a reducer.

* * * * *